(12) United States Patent
Thompson et al.

(10) Patent No.: US 12,014,610 B2
(45) Date of Patent: Jun. 18, 2024

(54) FIXED RETAIL SCANNER WITH EXTENDED WEIGH PLATTER CROWN, VISUAL INDICATORS, AND RELATED METHODS OF OPERATION

(71) Applicant: Datalogic USA, Inc., Eugene, OR (US)

(72) Inventors: Ryan Thompson, Eugene, OR (US); Richard Neel, Eugene, OR (US); Alan Shearin, Eugene, OR (US); Mohamed Hamidat, Les Ulis (FR); Matt Monte, Eugene, OR (US); Anne Kelley, Corvallis, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 17/981,344

(22) Filed: Nov. 4, 2022

(65) Prior Publication Data

US 2024/0153361 A1 May 9, 2024

(51) Int. Cl.
*G07G 1/00* (2006.01)
*G06K 7/10* (2006.01)
*G06V 20/52* (2022.01)

(52) U.S. Cl.
CPC ....... *G07G 1/0072* (2013.01); *G06K 7/10732* (2013.01); *G06K 7/10861* (2013.01); *G06K 7/1096* (2013.01); *G06V 20/52* (2022.01); *G07G 1/0018* (2013.01); *G07G 1/009* (2013.01)

(58) Field of Classification Search
CPC .................................................. G06K 7/1096
See application file for complete search history.

(56) References Cited

U.S. PATENT DOCUMENTS

| | | |
|---|---|---|
| 5,834,708 A | 11/1998 | Svetal et al. |
| D631,478 S | 1/2011 | McQueen et al. |
| D642,178 S | 7/2011 | Mcqueen |
| D659,142 S | 5/2012 | Mcqueen et al. |
| D676,446 S | 2/2013 | Mcqueen et al. |
| 8,430,318 B2 | 4/2013 | Mcqueen et al. |
| 8,448,859 B2 | 5/2013 | Goncalves et al. |
| 8,462,212 B1 | 6/2013 | Kundu et al. |
| D708,183 S | 7/2014 | Thompson et al. |
| 9,004,359 B2 | 4/2015 | Shearin et al. |
| D728,574 S | 5/2015 | Thompson et al. |
| 9,064,395 B2 | 6/2015 | Shearin et al. |
| D741,332 S | 10/2015 | Thompson et al. |
| 9,305,198 B2 | 4/2016 | Thompson et al. |
| 10,049,247 B2 | 8/2018 | Gao |
| 10,133,895 B2 | 11/2018 | Bruni et al. |
| 10,248,896 B2 | 4/2019 | Gao et al. |

(Continued)

OTHER PUBLICATIONS

U.S. Appl. No. 63/293,563, filed Dec. 23, 2021, Howard et al.

(Continued)

*Primary Examiner* — Suezu Ellis
(74) *Attorney, Agent, or Firm* — Foley & Lardner LLP

(57) ABSTRACT

A bi-optic data reader has a horizontal housing portion including a horizontal reading window, a vertical housing portion including a vertical reading window disposed between a left panel area and a right panel area of a body of the vertical housing portion, and a weigh platter having a horizontal weigh surface extending over the horizontal housing portion, and a crown extending over the vertical housing portion including overhanging portions that extend over the left panel area and the right panel area.

20 Claims, 8 Drawing Sheets

(56) References Cited

U.S. PATENT DOCUMENTS

| | | |
|---|---|---|
| 10,326,943 B2 | 6/2019 | Crooks et al. |
| 10,796,117 B2 | 10/2020 | Bruni et al. |
| 10,824,826 B2 | 11/2020 | Guess et al. |
| 11,113,683 B2 | 9/2021 | Crooks |
| 11,182,572 B2 | 11/2021 | Gururaja et al. |
| 2003/0078849 A1 | 4/2003 | Snyder |
| 2013/0327829 A1* | 12/2013 | Thompson ......... G06K 7/10841 |
| | | 235/440 |
| 2013/0328682 A1 | 12/2013 | Shearin et al. |
| 2015/0069123 A1 | 3/2015 | Thompson et al. |
| 2020/0125812 A1 | 4/2020 | Canini et al. |
| 2021/0073494 A1 | 3/2021 | Conticello |
| 2021/0192157 A1 | 6/2021 | Barkan et al. |
| 2021/0295300 A1 | 9/2021 | Crooks |
| 2022/0075971 A1 | 3/2022 | Gururaja et al. |
| 2023/0206014 A1* | 6/2023 | Howard ............... G06K 7/1417 |
| | | 235/462.41 |
| 2023/0206205 A1* | 6/2023 | Howard ............... G07G 1/0045 |
| | | 705/23 |

OTHER PUBLICATIONS

MAGELLAN 9300i/9400i Data Sheet, 2015.
MAGELLAN 9800i Data Sheet, 2012.
MP7000 Scanner Scale Product Spec Sheet, Dec. 13, 2021.
NCR REALSCAN 79E Data Sheet, 2018, 4 pages.

* cited by examiner

FIXED RETAIL SCANNER WITH EXTENDED WEIGH PLATTER CROWN, VISUAL INDICATORS, AND RELATED METHODS OF OPERATION

TECHNICAL FIELD

The present disclosure relates generally to scanners or code readers, and more particularly, to fixed retail scanners having an extended weigh platter crown and visual indicators.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

As known, in optical code reading, it is important to give the user a clear and unmistakable feedback of the success/failure of the decoding operation. In fact, the operation of reading a particular optical code can give negative results for various reasons, among which the imperfection of the code due, for example, to damages to the label on which it is obtained, the distance between the reader and the code, or the variation of said distance during the scanning time. In addition, even when the code is correctly acquired, decoding the code may be impossible because, for example, the code does not fall within the categories of codes recognized by the reader. In any case, the user needs to know whether the code has been decoded before proceeding to read another code.

Acoustic, tactile, and/or visual feedback are already known and currently used for indicating to the user that the particular optical code has been decoded by the reader. Visual feedback has often been provided via LEDs visible to the user, which in some cases may also be visible to other cameras. As such, there is a need for additional improvements to weigh platters, visual feedback mechanisms for bi-optic readers used in checkout environments, and different messaging to be communicated to remote camera systems.

BRIEF SUMMARY

A bi-optic data reader comprises a horizontal housing portion including a horizontal reading window, a vertical housing portion including a vertical reading window disposed between a left panel area and a right panel area of a body of the vertical housing portion, and a weigh platter having a horizontal weigh surface extending over the horizontal housing portion, and a crown extending over the vertical housing portion including overhanging portions that extend over the left panel area and the right panel area.

A data reading system comprises a bi-optic data reader and a first remote camera. The bi-optic data reader includes a horizontal housing portion including a horizontal reading window, a vertical housing portion including a vertical reading window, a weigh platter having a horizontal weigh surface extending over the horizontal housing portion, and a crown extending over the vertical housing portion including overhanging portions that extend over the left panel area and the right panel area, and a controller configured to generate messages via visual indicators provided through light windows disposed in different planes of the vertical housing portion. The first remote camera has a field-of-view oriented to view the visual indicators of the bi-optic reader, and is configured to detect the messages and to trigger image or video capture in response thereto.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
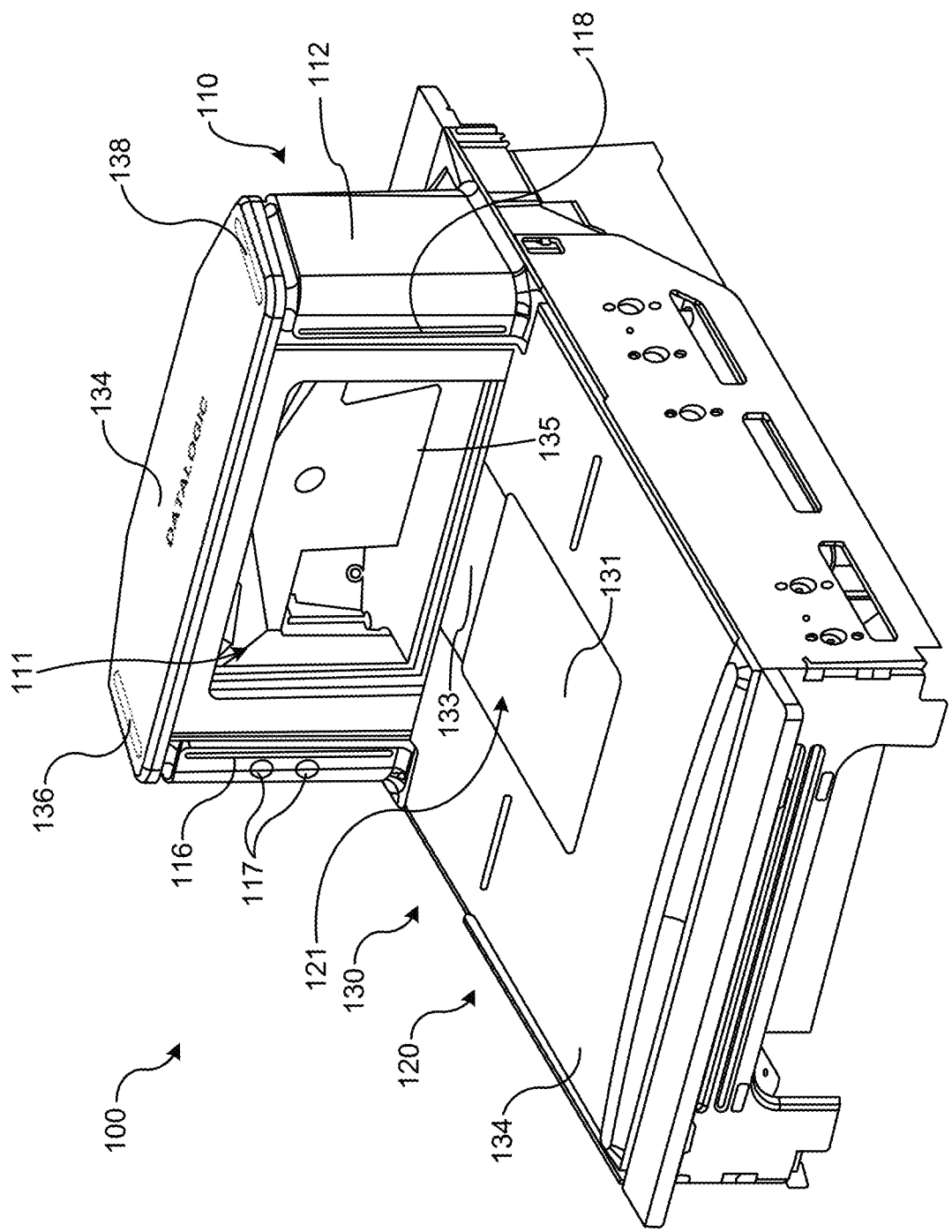
FIG. 1 is a perspective view of a bi-optic data reader according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Image data may also be captured by one or more imagers positioned external to the primary scanning unit, such as peripheral devices (e.g., top-down reader imagers, security imagers, bottom of basket readers, etc.), that may also provide image data to the fixed retail scanner and/or remote systems. While bi-optic data readers (also referred to as "scanners") are referred to throughout the disclosure and various exemplary embodiments, some embodiments of the disclosure may also include single plane data readers (e.g., horizontal or vertical only housings) or presentation scanners.

FIG. 1 is a perspective view of a bi-optic data reader 100 having a vertical housing portion 110 (sometimes referred to as "vertical housing") and a horizontal housing portion 120 (sometimes referred to as "horizontal housing") according to an embodiment of the disclosure. The data reader 100 may be a bi-optic fixed retail scanner configured to be installed at a retail location, such as in an assisted checkout lane (operated by a store employee) or as part of a self-checkout station (operated by customers). The vertical housing 110 may include a bonnet structure 112 (sometimes referred to as "bonnet" or "tower") that extends generally vertically when installed (e.g., upward from and above a countertop). The horizontal housing 120 may include a base structure that extends generally horizontally when installed (e.g., flush with the countertop). Thus, the vertical housing 110 and the horizontal housing 120 may be generally or substantially orthogonal with each other. The data reader 100 further includes a weigh platter 130 that provides a cover for the vertical housing 110 and the horizontal housing 120. The weigh platter 130 may include portions that form part of the vertical and horizontal surfaces of the data reader 100 as will be described more fully below.

The vertical housing 110 may include a structure that houses components that provide for one or more camera fields-of-view (through a vertical window 111). For example, the vertical structure provides an enclosure for one or more cameras and other optical elements (e.g., lenses, mirrors, etc.) and electrical elements (e.g., cables, circuit boards, processors, etc.) therein. Likewise, the horizontal housing 120 may include a structure and components that provide for one or more camera fields-of-view (through a horizontal window 121). For example, the vertical housing 110 provides an enclosure for one or more cameras and other optical elements (e.g., lenses, mirrors, etc.) and electrical elements (e.g., cables, circuit boards, processors, etc.) therein. As a result, a read zone (e.g., viewing volume, scan area, etc.) may be formed by the combined fields-of-view in the vertical plane and horizontal plane of the bi-optic data reader 100. Depending on the arrangement and orientation of the different opto-electrical elements, certain elements related to providing a horizontal field-of-view may be physically located within the vertical structure and vice versa, as further described herein.

Figure 2:
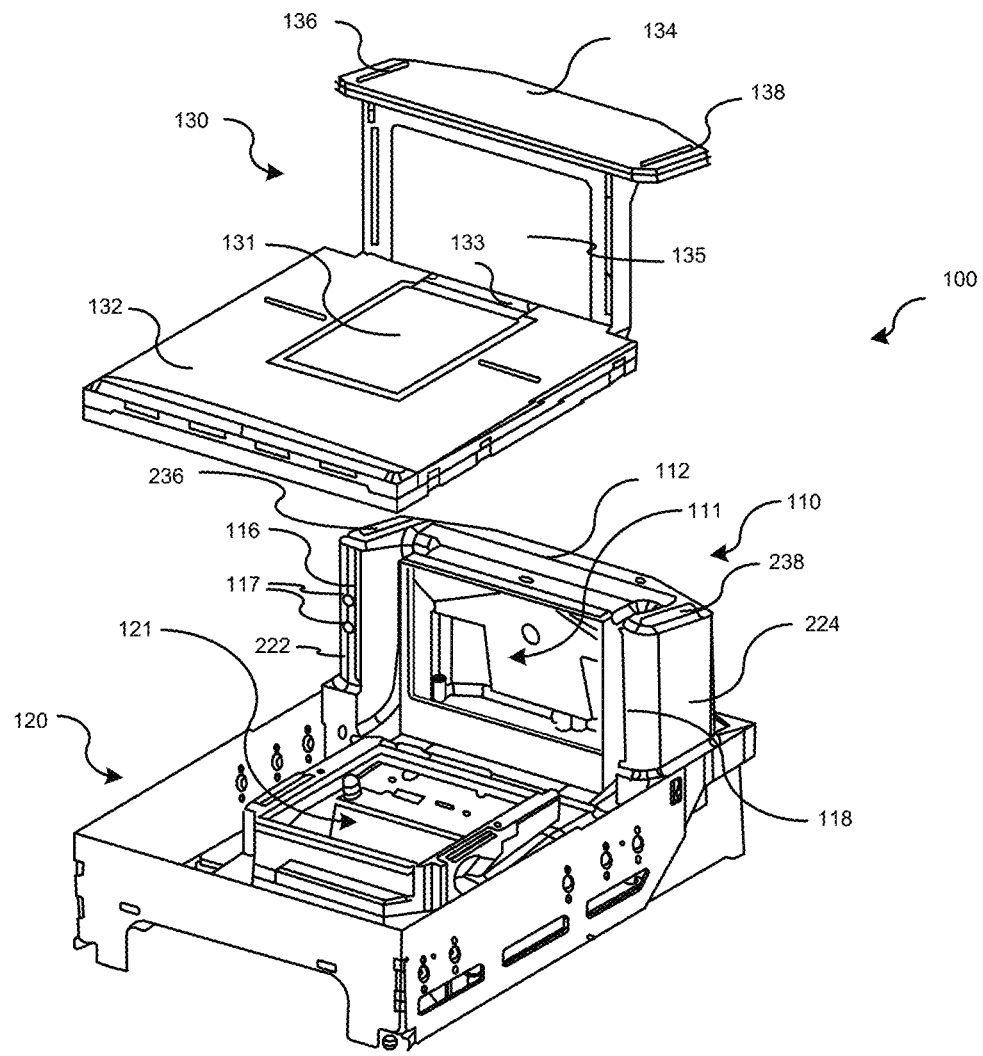
FIG. 2 is a perspective view of the weigh platter removed from the base structure of the data reader according to an embodiment of the disclosure.

The weigh platter 130 includes a horizontal weigh surface 132 that covers a portion of the horizontal housing 120 of the data reader 100. The horizontal weigh surface 132 is typically formed of a sturdy material, such as stainless steel, to be resistant to wear that comes from regular use where items are dragged across or otherwise contact the weigh platter 130. Stainless steel is also generally considered to be easily cleanable. The horizontal weigh surface 132 typically has its own window 131 with a transparent material located central area that aligns with the horizontal window 121 of the base unit to provide the horizontal viewing area. The weigh platter 130 may further include a crown 134 that extends over the vertical structure. The crown 134 may also function as a weigh surface, which is useful for larger items that rest on both the horizontal weigh surface 132 and the crown 134 for an accurate weight measurement. The weigh platter 130 further includes a vertical window 135 having a transparent material that covers and aligns with the vertical window 111 of the vertical housing 110. The vertical window 135 of the weigh platter 130 is connected to both the horizontal weigh surface 132 and the crown 134, thereby allowing for the weigh platter 130 to be installed and removable as a single unit, as shown in FIG. 2. The weigh platter 130 rests on load cells that form the scale assembly.

The horizontal weigh surface 132 often includes a bezel area 133 to eliminate a closed metallic loop problem created by an EAS tag deactivation system incorporated therein. In some embodiments, the bezel area 133 may also be a stainless steel material or other metallic material similarly capable of resisting wear and tear, which can be separated by gaps with in the remainder of the horizontal weigh surface 132 to break the closed metallic loop. In some embodiments, the bezel area 133 may be a plastic material as described in U.S. Pat. No. 9,064,395, issued Jun. 23, 2015, entitled "BEZEL WITH NON-METALLIC MATERIALS FOR COVER OR PLATTER FOR A DATA READER IN A CHECKOUT STATION," the disclosure of which is incorporated by reference in its entirety.

As previously described, the vertical housing portion 110 includes a body 112 that provides the housing for the tower structure forming the optical cavity where one or more components may reside. The body 112 may include a transparent vertical window 111 that provides for a vertical viewing area. As described above, the vertical window 135 of the weigh platter 130 covers and aligns with the vertical window 111 of the vertical housing 110. The width of the vertical window 135 of the weigh platter 130 may be less than the width of the horizontal weigh surface 132 of the weigh platter. The smaller width of the vertical window 135 may accommodate panel areas in the body 112 of the vertical housing portion 110 that are on the left and right sides of its vertical window 111. These panel areas may accommodate interface features, such as control buttons, visual indicators, sensors, speakers, etc. As an example referring to FIG. 1, the panel area of the body 112 on the left side of the vertical housing portion 110 includes control buttons 117 (e.g., volume controls, mode controls, user inputs, etc.). The crown 134 may also have a width that is greater than the width of the vertical window 135 of the weigh platter 130. The crown 134 may extend beyond the panel areas to overhang the panel areas. In some embodiments, crown 134 may extend the entire width of the vertical housing portion 110, which can provide for a larger weighing surface than conventional products. The vertical housing portion 110 may further include one or more visual indicators configured to provide visual indications related to events or other information about a transaction or activities involving the data reader 100.

A first visual indicator may be viewable through the crown 134 through a crown light window 136 disposed within the left overhang portion of the crown 134 that overhangs the left panel area of the body 112 of the vertical housing portion 110. The crown light window 136 extends in a generally horizontal plane with the crown 134 and provides an indicator viewed from a top perspective. A second visual indicator may be viewable through a front light window 116 disposed within the left panel area of the body 112 of the vertical housing portion 110. The front light window 116 may extend in a generally vertical plane with the body 112 and provide an indicator viewed from a front perspective. As described in more detail below, in some embodiments, the first visual indicator and the second visual indicator may receive light via a common illumination source having a light pipe that splits the light to the two different planes. As a result, the first visual indicator and the second visual indicator may operate simultaneously together to provide the same information from two different planes (one through the vertical panel area of the body 112 and the other through the extended platter crown 134). In some embodiments, different light sources may be used such that the first and second visual indicators may provide different information at times.

A third visual indicator may be viewable through the crown 134 through a crown light window 138 disposed within the right overhang portion of the crown 134 that overhangs the right panel area of the body 112 of the vertical housing portion 110. The crown light window 138 may extend in a generally horizontal plane with the crown 134 and provide an indicator viewed from a top perspective. A fourth visual indicator may be viewable through a front light window 118 disposed within the right panel area of the body 112 of the vertical housing portion 110 and provide an indicator viewed from a front perspective. As described in more detail below, in some embodiments, the third visual indicator and the fourth visual indicator may receive light via a common illumination source having a light pipe that splits the light to the two different planes. As a result, the third visual indicator and the fourth visual indicator may operate together simultaneously to provide the same information from two different planes (one through the vertical panel area of the body 112 and the other through the extended platter crown 134). In some embodiments, different light sources may be used such that the third and fourth visual indicators may provide different information at times.

The visual indicators may be illuminated in response to events, such as indicating a good read (i.e., barcode successfully decoded), a bad read (i.e., barcode not decoded), items entering the read zone, items exiting the read zone, indicating a settled weight for items being weighed, indicating an exception event occurring, indicating detection of a weighed item overhanging the weigh perimeter, among other events. Different colors may be used to provide such an indication that could be understood by the user and/or a remote camera system that is monitoring the area. For example, a green light may indicate a good read, a red light may indicate a bad read, a blue light may indicate weigh perimeter blockage, etc. In some embodiments, non-visible illumination, such as infrared (IR), may be generated for the visual indicators to provide information to remote camera devices outside of the view of the user. Additional methods of indication may be implemented, including applying different frequencies for light pulsing or other data modulation techniques. In an embodiment, colors may be alternated or combined to produce non-primary colors (e.g., purple). Combinations of such methods are also contemplated for providing a wide variety of indications.

FIG. 2 is a perspective view (exploded) of the weigh platter 130 removed from the base structure of the data reader 100 according to an embodiment of the disclosure. The weigh platter 130 is generally removable as a single structure that includes a horizontal weigh surface 132 and the crown 134 that are connected via the vertical window 135. As described above, the crown 134 likewise provides a weighing surface for large items that may rest on both the base weighing surface 132 and the crown 134 as detected by the connected load cell.

With the weigh platter 130 removed, areas below the weigh platter 130 may be exposed including the vertical window 111 that seals the vertical optical cavity and the horizontal window 121 that seals the horizontal optical cavity. Additional space and pockets exist within the horizontal and vertical housing areas to accommodate the weigh platter 130 when attached.

With the weigh platter 130 removed, additional light windows 236, 238 are viewable. For example, transparent window 236 is disposed within a top portion of the left panel area 222 of the body 112, and transparent window 238 is disposed within a top portion of the right panel area 224 of the body 112. Transparent window 236 in the left panel area 222 lies in a substantially horizontal plane that is substantially aligned with the crown light window 136 disposed in the left overhang region of the crown 134. This allows for light generated within the vertical housing 110 for the first visual indicator to pass through both transparent windows (top light window 236 and crown light window 136) for external viewing. Transparent window 238 in the right panel area 224 lies in a substantially horizontal plane that is substantially aligned with the crown light window 138 disposed in the right overhang region of the crown 134. This allows for light generated within the vertical housing 110 for the third visual indicator to pass through both light windows (top light window 238, crown light window 138) for external viewing.

Figure 3:
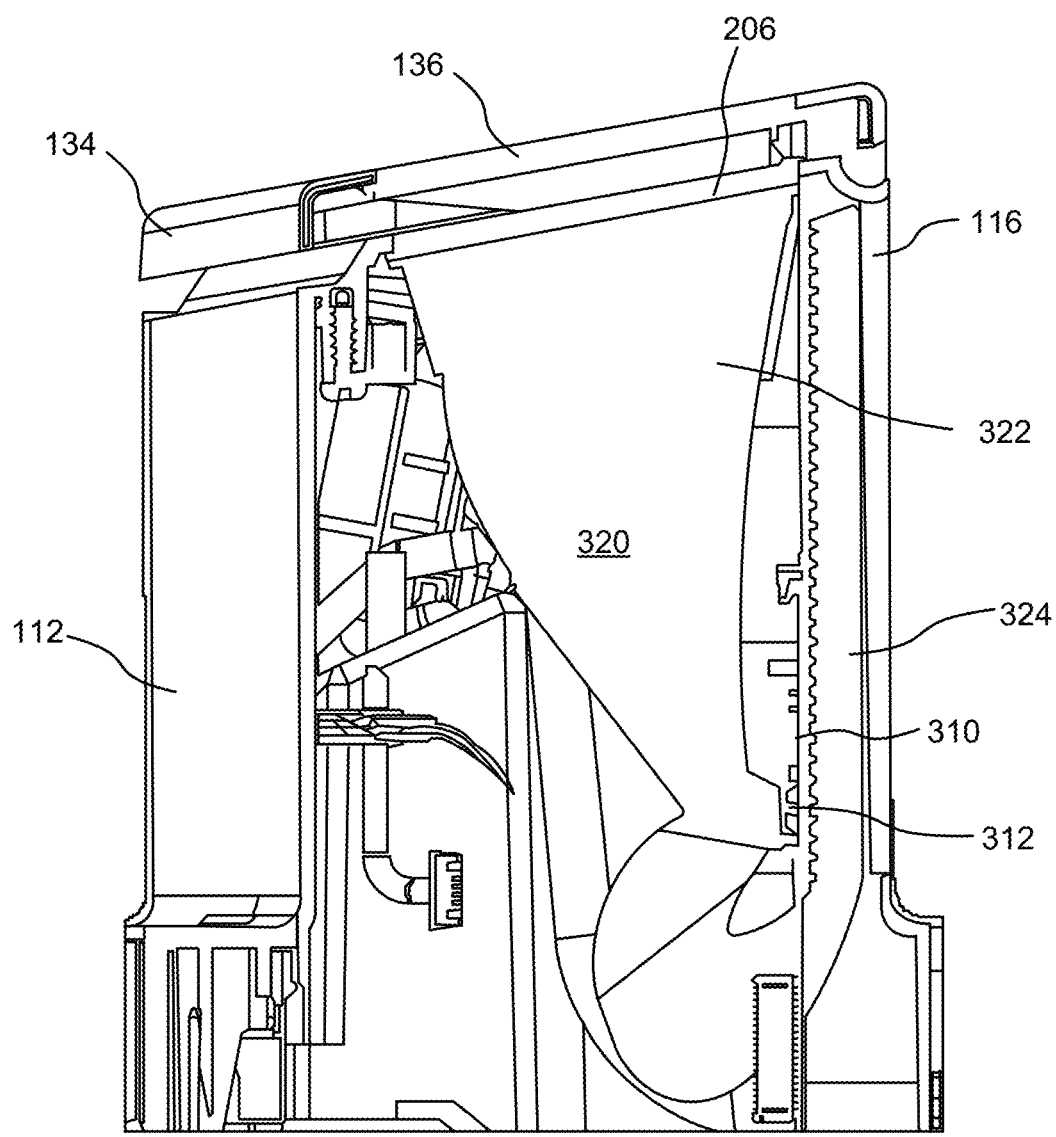
FIG. 3 is a side view of the vertical structure of the data reader of FIG. 1 with the side surface exposed showing the internal components thereof.

FIG. 3 is a side view of the vertical structure of the data reader of FIG. 1 with the side surface exposed showing the internal components thereof—similar to a cross-sectional view. In particular, FIG. 3 focuses on elements of the visual indication system of one of the sides of the data reader, such as one of the panel areas on the left or right of the vertical reading window. Similar components of such a visual indication system may be located on each side of the vertical structure such that visual indicators are provided on both the left side as well as the right side of the vertical reading window, as shown in FIGS. 1 and 2. For discussion purposes, the numbering associated with the left side of the data reader is used.

The vertical structure includes the body 112 of the vertical housing portion 110 with the crown 134 of the weigh platter 130 extending over its top portion. The panel areas of the body 112 define apertures therein for accommodating light to be exposed for the respective visual indication system. These apertures may be filled by transparent materials allowing for such transmission of light for the visual indicator system while also providing for a seal of the body 112 (which houses optical and electrical components as described above). For example, the front light window 116 may be provided within the front facing aperture of the bonnet 112 to allow light to pass therethrough. The top light window 206 may be provided within the top aperture of the body (in the panel area) to allow light to pass therethrough. This top light window 206 may align with the crown light window 136 in the crown 134 of the weigh platter 130 to allow such light to be further transmitted externally. The front light window 116 and the crown light window 136 may be diffusive materials for a more pleasing effect for external viewing. In some embodiments, the top light window 206 of the body 112 may be a non-diffusive material (or at least less diffusive than the corresponding crown light window 136 of the crown 134) so that more direct light is received by the crown light window 136 that is diffusive.

Light source 312 may be mounted on a printed circuit board 310 that is secured within the body 112 of the vertical housing portion 110. The light source 312 may include one or more light sources (e.g., light-emitting diodes (LEDs)) configured to generate light for the respective visual indicators. In some embodiments, a single LED may be provided, whereas in other embodiments, a plurality of LEDs may be provided that are substantially co-located on the printed circuit board 310. In some embodiments, the light sources 312 and printed circuit board 310 are mounted such that the light sources 312 are directed in an orientation that is away from (e.g., opposite) the front light window 116.

A light pipe 320 (also referred to as a "light guide") may be provided within the panel area that is mounted to align with light source 312. Filler material (e.g., silicon) may be provided to surround the light pipe 320 in place within the panel area. The light pipe 320 may be configured to direct the generated light to two different planes of the data reader 100. For example, a first portion 322 of the light pipe 320 directs the light to the top light window 206 (and on to the crown light window 136), while a second portion 324 of the light pipe 320 directs light to the front light window 116.

Figure 4:
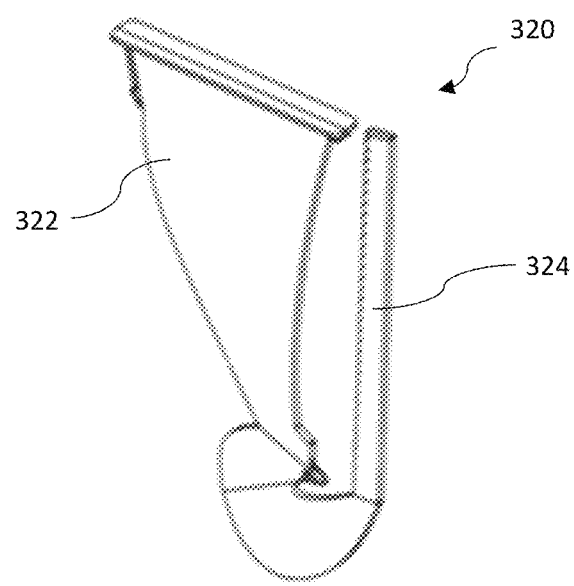
FIG. 4 is a perspective view of the light pipe according to embodiments of the disclosure.

FIG. 4 is a perspective view of the light pipe 320 according to embodiments of the disclosure. The first portion 322 directs light in the direction of the initial light generation and upward toward the crown light window of the crown (lying in a horizontal plane of the data reader). The second portion 324 extends around the bottom of the light pipe 320 and around the back side opposite of the direction of the initial generation of light and up an arm extending parallel to the front light window of the panel area (lying in a vertical plane of the data reader).

Figure 5:
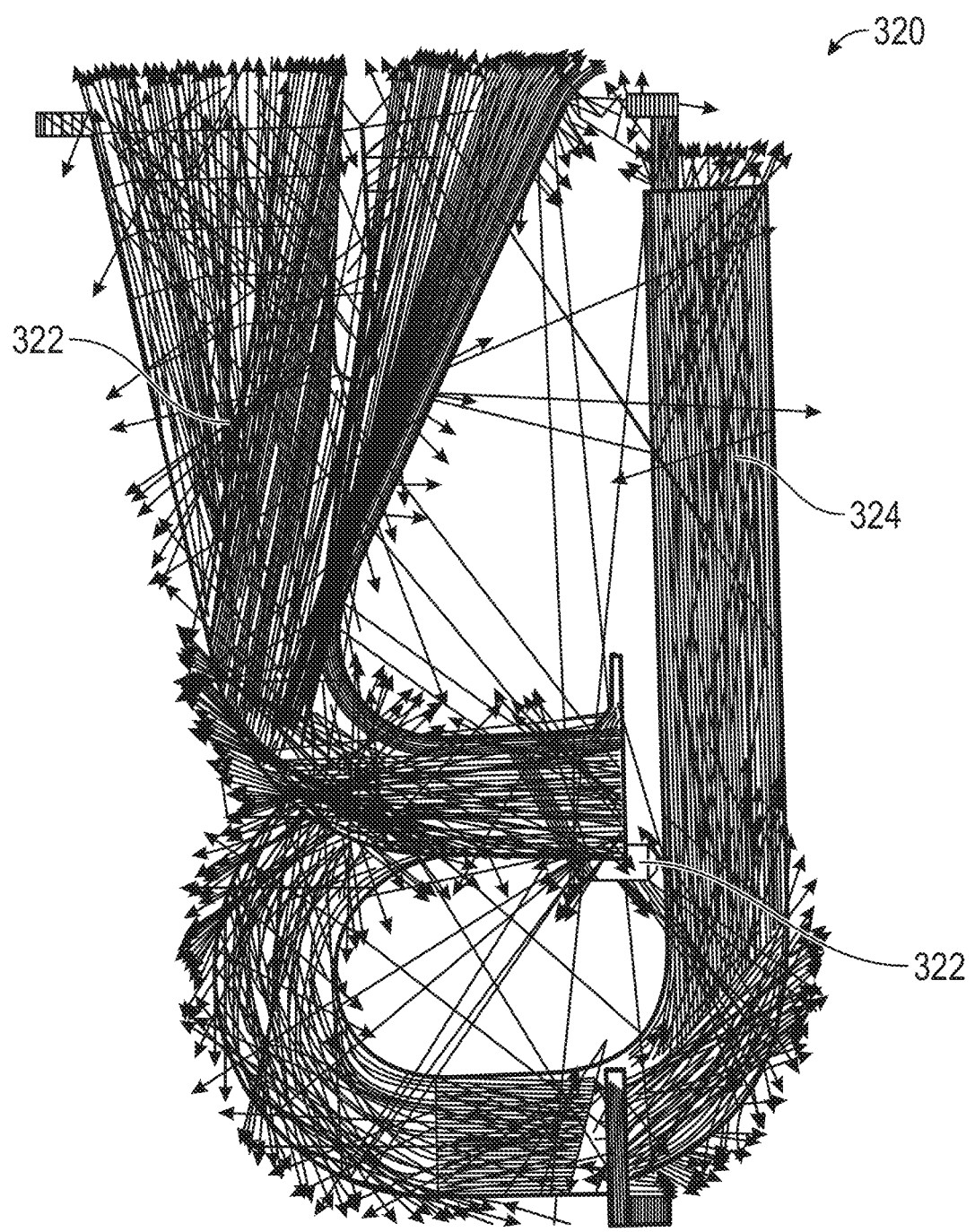
FIG. 5 is a simplified ray trace simulation model for the light pipe.

FIG. 5 is a simplified ray trace simulation model for the light pipe 320. In operation, the LEDs produce illumination that enters the light pipe 320. The shape and structure of the light pipe 320 splits light in the two directions to provide visual indicators via total internal reflection in two different planes are described above.

Figure 6:
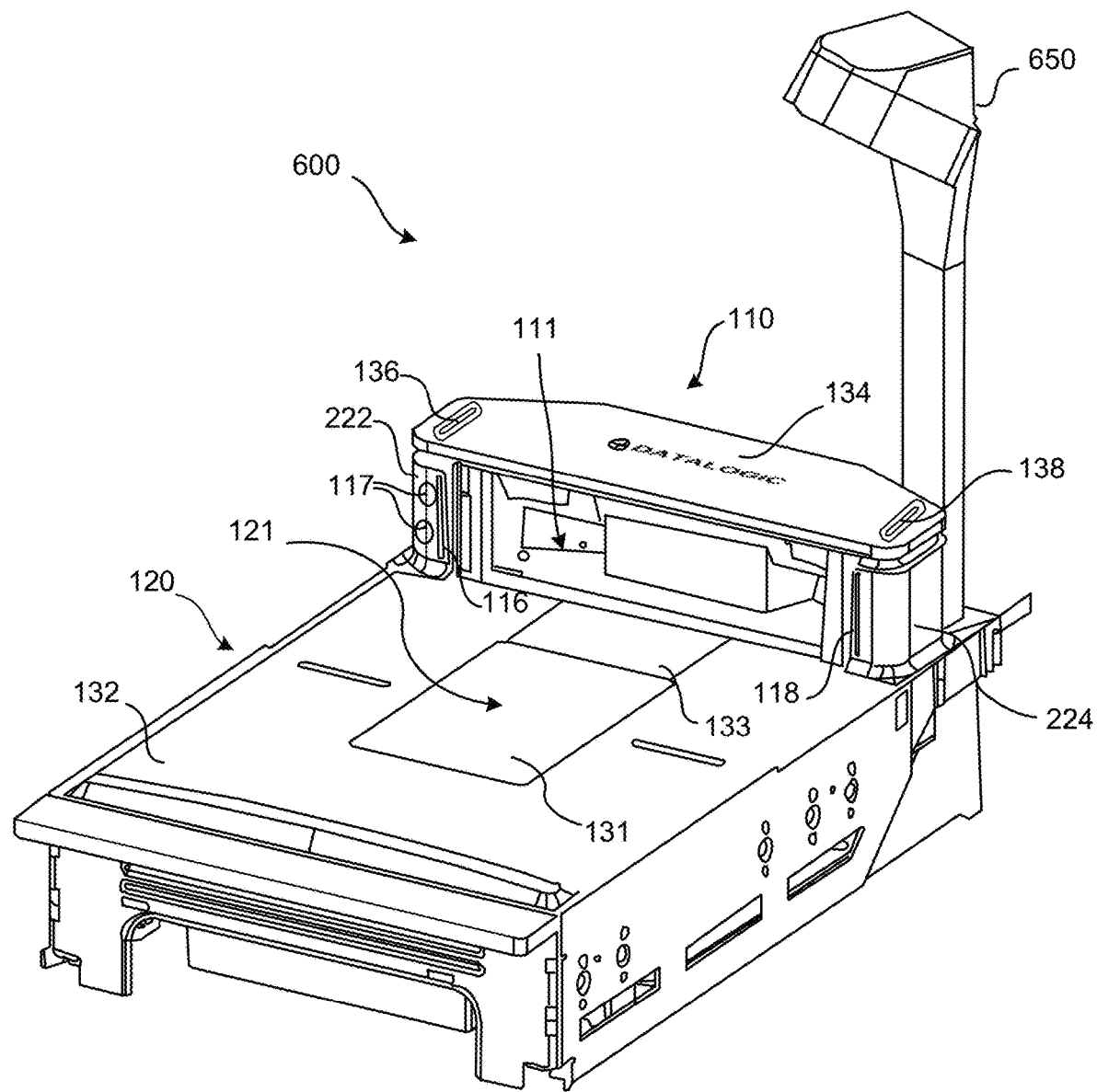
FIG. 6 is a perspective view of a data reader according to an embodiment of the disclosure.

FIG. 6 is a perspective view of a data reader 600 according to an embodiment of the disclosure. As with the data reader of FIG. 1, the data reader of FIG. 6 may also be a bi-optic fixed retail scanner having a vertical housing 110 and a horizontal housing 120. The vertical housing of FIG. 6 may have a lower profile bonnet compared to that of FIG. 1, which may result in internal cameras having a lower incidence angle. Thus, such a form factor may be particularly well suited to include a top-down reader (TDR) 650 as an optional add-on to the data reader 200. Visual indicators in the panel areas may be similarly constructed as described above, including being provided in two different planes of the data reader via vertical front light windows 116, 118 and horizontal crown light windows 136, 138.

As a result of these various embodiments, visual indicators may be viewable from both a top perspective as well as a front perspective. The viewable visual indicators is also the case even with an extended crown of the weigh platter 130 that overhangs the panel area of the vertical housing portion 110. Different visual indicators may also be generated independently of each other with different methods of indications for different events. In some embodiments, the light widows of the different planes may be located differently. For example, the crown light windows lying in the horizontal plane of the crown 134 may be located at the front or the back or other area of the crown 134. Instead of (or in addition to) extending from front to back of the crown, the crown light windows may extend from side to side. In some embodiments, the shape of the crown light windows may be more complex shapes instead of lines, including curves or other shapes defined by the design of the light pipe(s) and corresponding light windows. Similarly, the front light windows lying in the vertical plane of the panel area may be located at the top or bottom or other area of the panel area of the body 112. Instead of (or in addition to) extending from top to bottom of the panel area, the front light windows may extend from side to side. In some embodiments, the shape of the front light windows may be more complex shapes instead of lines, including curves or other shapes defined by the design of the light pipe(s) and corresponding light windows.

Figure 7:
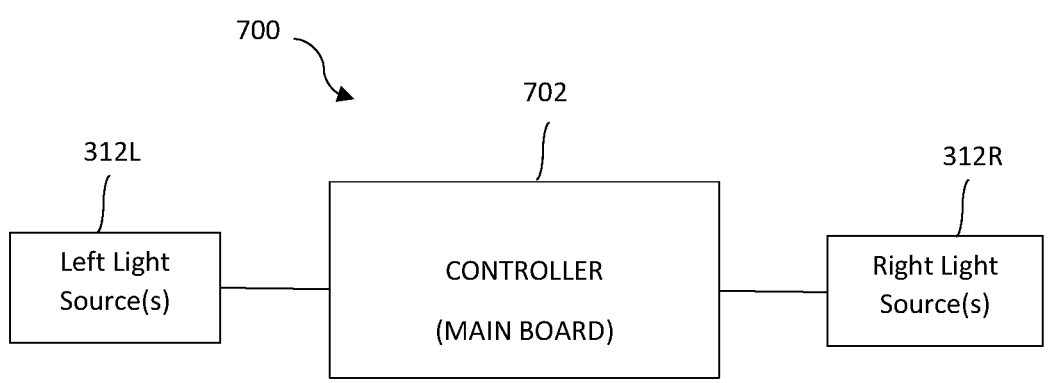
FIG. 7 is a simplified block diagram of a visual indication system according to an embodiment of the disclosure.

FIG. 7 is a simplified block diagram of a visual indication system 700 according to an embodiment of the disclosure. The visual indication system 700 includes a controller 702 configured to control the light sources 312L, 312R used to generate the visual indicators. The left light source 312L may correspond to the LEDs disposed within the left side of the panel area 222 of FIG. 2 that provide light to the crown light window 136 and/or the front light window 116. The right light source 312R may correspond to the LEDs disposed within the right side of the panel area 224 of FIG. 2 that provide light to the crown light window 138 and/or the front light window 118. The controller 702 may be configured to control the left light sources 312L independently of the right light sources 312R such that different visual indications may be generated on each side at different times. As described above, a common light source may be used to generate visual indicators in different planes such that a pair of visual indicators (e.g., 116/136 pair and 118/138 pair) may be generated together. In some embodiments where different LEDs (and light pipes) may be used within a given panel area, additional control signals may be able to control individual visual light indicators instead of just pairs. In such an embodiment, four different visual indicators may be independently controlled for each of the light windows 116, 118, 136, 138. Additional numbers of visual light indicators are also contemplated, including odd numbers that are not necessarily in pairs.

The controller 702 may be the main system controller that may be operably coupled with other system components, such as imagers, active illumination sources, scale (e.g., load cell), co-processing modules, interfaces, etc. Thus, the controller 702 may perform other control operations for the system, such as controlling the operation of the imagers (e.g., image capture) and related illumination sources for active illumination of the scanning area. The controller 702 may also be configured to process images for the decoding of machine-readable indicia, object recognition, motion tracking, etc.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Patent issued Aug. 14, 2018, entitled "OPTIMIZATION OF IMAGE FRAME MANAGEMENT IN A SWEEP-STYLE OPTICAL CODE DATA READE," U.S. Patent issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," and U.S. Patent Application Ser. No. 63/293,563, filed Dec. 23, 2021, and entitled "FIXED RETAIL SCANNER WITH MULTI-PORT NETWORK SWITCH AND RELATED METHODS, the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 8:
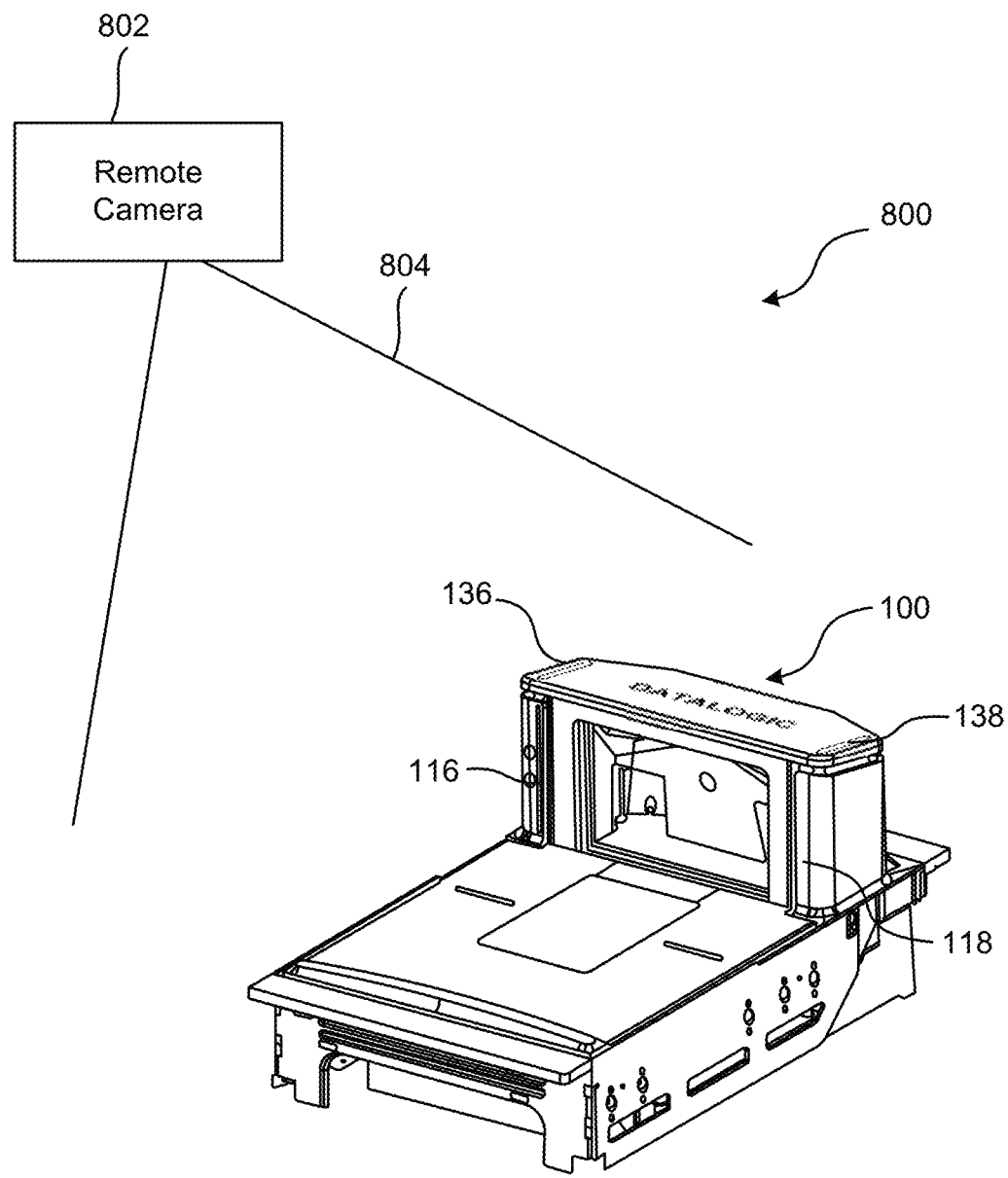
FIG. 8 is a simplified diagram of a checkout system according to an embodiment of the disclosure.

FIG. 8 is a simplified diagram of a checkout system 800 according to an embodiment of the disclosure. The checkout system 800 includes a data reader 100 as described above and a remote camera 802 having a field-of-view 804 that encompasses the area where the data reader 100 is installed. Although not shown, the data reader 100 is typically installed in a checkout area of a retail environment such as being installed in a counter of an assisted checkout lane or a self-checkout area.

The remote camera 802 may be a remote security camera mounted at an overhead location (e.g., ceiling, pole, stand, etc.) in the retail environment. In some embodiments, the remote imager may be a top-down reader. Although one remote camera 802 is shown, it should be understood that a checkout area may include any number of remote cameras having different fields-of-view that may at least partially overlap.

As described above, the visual indication system may provide visual indicator in at least two different planes of the vertical housing portion of the data reader 100. For example, visual indicators may be provided via front light windows 116, 118 in the front panel area (vertical plane) to be viewable from a front perspective, and visual indicators 118, 138 may be provided via crown light windows in the crown (horizontal plane) to be viewable from a top perspective. These visual indications may be useful dual perspectives for a user to see the visual indicators related to good reads, bad reads, error modes, etc. These dual perspectives may also be useful for the remote camera 802 to see depending on its perspective and field-of-view. The remote camera 802 may analyze its images and detect the visual indications related to the different events, and take different actions in response thereto (e.g., trigger image capture, trigger video recording, correlate detected events with other data, etc.).

In a first example, the data reader 100 may be configured to detect an item entering the field-of-view of the read zone and the item exiting the field-of-view of the read zone. A first message may be generated via the visual indication system (e.g., activating all visual indicators 116, 118, 136, 138 in a first manner) indicating that the item has entered the read zone. The remote camera 802 may detect the first message by viewing the one or more visual indicators operating in the first manner, which may trigger a response such as activating image capture and/or video recording by the remote camera 802 or other analysis. A second message may be generated via the visual indication system (e.g., activating all visual indicators 116, 118, 136, 138 in a second manner) indicating that the item has exited the read zone. The remote camera 802 may detect the second message by viewing the one or more visual indicators operating in the second manner, which may trigger a response such as de-activating image capture and/or video recording by the remote camera 802 or ceasing other analysis. Having visual indicators viewable from different planes of the vertical housing portion of the data reader may increase the chances that the visual indicators are detected by the remote camera 802 and allow for more flexible locations for positioning the remote camera 802. Images and/or video captured during the active period for the remote camera 802 may be transferred to a host and/or the data reader via a specific interface including wireless and/or wired connections.

As mentioned previously, the messages that are detectable by the remote camera 802 may be visible or invisible to a human user. Messages may be variable in terms of color (e.g., visible to a human) or other methods such as a variable duration with pulse widths, pulse frequencies, other modulation techniques (e.g., invisible to a human). The messages may be different when the item enters the read zone as compared to when the item exits the read zone so that the remote camera 802 is able to distinguish between the two.

In some embodiments, the data reader 100 may provide additional information regarding the entering and exiting of the item within the scan zone. For example, the data reader 100 may detect that the item enters the scan zone from the right side of the scan zone. The data reader 100 may generate the item entry message via the visual indicators (e.g., windows 118, 138) on the right side of the data reader 100, while not activating the visual indicators on the left side of the data reader 100. In another instance, the data reader 100 may detect that the item enters the scan zone from the left side of the scan zone. The data reader 100 may generate the item entry message via the visual indicators (e.g., windows 116, 136) on the left side of the data reader 100, while not activating the visual indicators on the right side of the data reader 100.

In another example, the data reader 100 may detect that the item exits the scan zone on the right side of the scan zone. The data reader 100 may generate the item exit message via the visual indicators (e.g., windows 118, 138) on the right side of the data reader 100, while not activating the visual indicators on the left side of the data reader 100. In another instance, the data reader 100 may detect that the item exits the scan zone to the left side of the scan zone. The data reader 100 may generate the item exit message via the visual indicators (e.g., windows 116, 136) on the left side of the data reader 100, while not activating the visual indicators on the right side of the data reader 100.

Providing such messages along with corresponding visual indicators on either the left or right side of the data reader may provide additional information to the remote camera 802 that may be helpful in tracking events and object motion to know if an item was moved from one side of the scan volume to the other, or if the item was simply moved from in and out of one side. In some embodiments, moving the item from one side to the other may trigger activation of a different camera that may be focused on a different part of the transaction area such as the bagging area. Thus, in one embodiment, if a first remote camera is focused on the scan zone, this first remote camera may be triggered by the initial entry of the item into the scan zone. If a second remote camera is focused on the bagging area, this second remote camera may only be triggered by the exit of the item on the side where the bagging area is located. If the second remote camera focused on the bagging area does not have the data reader 100 within its field-of-view (and therefore is not able to detect the specific messages of the visual indicators), the first remote camera may send a trigger signal (e.g., over a remote camera network) to the second camera when the first camera detects a message that would affect the operation of the second camera.

Any foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A bi-optic data reader, comprising:
  a horizontal housing portion including a horizontal reading window;
  a vertical housing portion including a vertical reading window disposed between a left panel area and a right panel area of a body of the vertical housing portion; and
  a weigh platter having a horizontal weigh surface extending over the horizontal housing portion, and a crown extending over the vertical housing portion including overhanging portions that extend over the left panel area and the right panel area.

2. The bi-optic data reader of claim 1, wherein the crown includes a crown light window for providing a first visual indicator from a light source.

3. The bi-optic data reader of claim 2, wherein the crown light window is disposed within at least one of a front portion of the crown or a back portion of the crown.

4. The bi-optic data reader of claim 2, wherein the crown light window is disposed within at least one overhanging portion of the crown.

5. The bi-optic data reader of claim 4, wherein at least one of the left panel area and/or the right panel area corresponding to the overhanging portion of the crown includes a front light window for providing a second visual indicator from a light source.

6. The bi-optic data reader of claim 5, wherein first visual indicator for the crown light window and the second visual indicator for the front light window are generated via a common light source disposed within the vertical housing portion.

7. The bi-optic data reader of claim 6, further comprising a light pipe disposed within the right panel area or the left panel area aligns with the common light source, and is configured to direct light to two different planes of the bi-optic data reader including the crown light window and the front light window.

8. The bi-optic data reader of claim 1, further comprising:
a first crown light window disposed within the crown for providing a first visual indicator from a first light source; and
a first front light window disposed within one of the left panel area or the right panel area for providing a second visual indicator from the first light source.

9. The bi-optic data reader of claim 8, wherein the first crown light area is disposed in a left overhanging portion of the crown, and the first front light window is disposed in the left panel area.

10. The bi-optic data reader of claim 9, further comprising:
a second crown light window disposed within the right overhanging portion of the crown for providing a third visual indicator from a second light source; and
a second front light window disposed within the right panel area for providing a fourth visual indicator from the second light source.

11. The bi-optic data reader of claim 10, further comprising a controller configured to control the first and second visual indicators independently of the third and fourth visual indicators.

12. The bi-optic data reader of claim 11, wherein the controller is configured to activate the first, second, third, and fourth visual indicators to generate:
a first message indicating entry of an item into a read zone for the bi-optic data reader; and
a second message indicating exit of the item from the read zone for the bi-optic data reader.

13. The bi-optic data reader of claim 12, wherein the first message is generated by the respective visual indicators located on a side of the bi-optic data reader where the entry of the item is detected, and wherein the second message is generated by the respective visual indicators located on a side of the bi-optic data reader where the exit of the item is detected.

14. A data reading system, comprising:
a bi-optic data reader including:
a horizontal housing portion including a horizontal reading window;
a vertical housing portion including a vertical reading window;
a weigh platter having a horizontal weigh surface extending over the horizontal housing portion, and a crown extending over the vertical housing portion including overhanging portions that extend over a left panel area and a right panel area of the vertical housing portion; and
a controller configured to generate messages via visual indicators provided through light windows disposed in different planes of the vertical housing portion; and
a first remote camera having a field-of-view oriented to view the visual indicators of the bi-optic data reader, and configured to detect the messages and to trigger image or video capture in response thereto.

15. The data reading system of claim 14, wherein the vertical housing portion includes a left panel area and a right panel area with the vertical reading window positioned therebetween, and wherein the crown of the weigh platter includes overhanging portions that extend over the left panel area and the right panel area.

16. The data reading system of claim 15, wherein at least some of the light windows are disposed in one of the left panel area or the right panel area including a top light window in a horizontal surface and a front light window in a vertical surface.

17. The data reading system of claim 16, wherein a corresponding overhanging portion of the crown includes a crown light window at least partially aligned with the top light window.

18. The data reading system of claim 14, wherein the messages include an item entry message responsive to the bi-optic data reader detecting entry of an item into a read zone, and an item exit message responsive to the bi-optic data reader detecting exit of the item from the read zone.

19. The data reading system of claim 14, further comprising a second remote camera having a field-of-view oriented to view another area that is different than an area that the first remote camera views, wherein the first remote camera is configured to transmit a trigger signal over a network to the second remote camera for the second remote camera to trigger image or video capture in response thereto.

20. The data reading system of claim 19, wherein the first remote camera is configured to transmit the trigger signal to the second remote camera responsive to the first remote camera detecting an item exit message from the bi-optic data reader generated via the visual indicators.

\* \* \* \* \*